United States Patent Office 3,428,447
Patented Feb. 18, 1969

3,428,447
RECOVERY OF METAL FROM INSULATED ELECTRICAL CABLE
Gilbert I. Addis, Plainfield, N.J., assignor to Union Carbide Corporation, a corporation of New York
No Drawing. Continuation-in-part of application Ser. No. 448,277, Apr. 15, 1965. This application Mar. 5, 1968, Ser. No. 710,624
U.S. Cl. 75—66                                   18 Claims
Int. Cl. C22b 27/00; B29h 19/02; H01b 7/34

ABSTRACT OF THE DISCLOSURE

Alkali metal is recovered from insulated alkali metal conductors by reducing the conductor to segments of a suitable size, heating the segments in an inert media to a temperature above the melting temperature of the alkali metal but below the decomposition temperature of the insulation. The segments are preferably heated in an oil bath.

Background of the invention

This is a continuation-in-part of application Ser. No. 448,277, filed Apr. 15, 1965, and now abandoned, and relates to a method for recovering metal from insulated conductor scrap wherein the conductor metal is an alkali metal.

In the past discarded cables utilizing high melting point conductor metals were salvaged to a degree by burning off the insulation covering the cable and then melting the metal conductor and purifying it or by stripping the insulation from the conductor. This method of conductor recovery has been proven relatively costly and time consuming.

Recently, insulated alkali metal conductors have been proposed which provide unique advantages both in weight savings, ease of manufacture and economics. Unfortunately, the prior art methods of recovering scrap metal conductors are not applicable to these new conductors because of their high degree of reactivity.

Since the recovery of scrap conductor provides distinct economic advantages to the use of these conductors, it becomes highly important to provide a safe and efficient means to recover these conductor metals. Recovery is especially important when large diameter conductors are scrapped as well as when the more expensive alkali metals such as lithium or potassium are involved.

It is therefore an object of this invention to provide a safe and economical means for the recovery of alkali metal conductor from insulated alkali metal electrical conductor.

It is a further object of this invention to provide a method for the recovery of the insulation from said conductors.

Summary of the invention

A method has now been found to recover alkali conductor metal from insulated alkali metal electrical conductors which comprises reducing the conductor to segments of suitable size, heating the segments in a media substantially inert to the alkali metal, to a temperature above the melting point of the alkali metal but below the melting point of the insulating material and recovering the molten alkali metal. The insulated alkali metal conductor segments can be heated in a bath of alkali metal as well as in a heated oil bath under conditions wherein the oil and molten alkali metal segregate to allow recovery of the alkali metal.

Description

In accordance with this invention then, alkali metal is recovered from insulated conductor cable scrap by segmenting the electrical conductor into small and convenient lengths and melting the conductor metal in an inert atmosphere. The conductor insulation is readily recovered or separated from the molten alkali metal by mechanical means, as will be more fully described hereinafter.

By the term "alkali metals" is meant those metals of Group I–A of the Periodic Chart of the Elements as set forth within the cover of the "Merck Index," seventh edition, published by Merck and Company, Inc., 1960. Included within the term "alkali metals" are lithium, sodium and potassium and alloys of these metals wherein a predetermined amount of the alkali metal is present in the alloy. Included within such alloys are lithium-sodium alloy, sodium-potassium alloy, sodium-mercury alloy, and the like. Sodium and its alloys are the preferred alkali metals.

The insulation most readily and effectively provided for these conductors are the non-reactive polymer resins. Included within these resins are the thermoplastic polymers and the thermo-setting polymers. Illustrative of such thermoplastic polymers are the olefin polymers such as low density polyethylene, high density, or linear polyethylene, polypropylene, polybutylene, polystyrene and the like as well as the olefin copolymers wherein a predominant amount of an olefin monomer is polymerized with another copolymerizable monomer. Illustrative of such copolymers are ethylene/propylene copolymers, ethylene/butylene copolymers, propylene/butylene copolymers, ethylene/styrene copolymers, propylene/styrene copolymers, butylene/styrene copolymers, styrene/butadiene copolymers, acrylonitrile/styrene/butadiene copolymers, ethylene/vinyl acetate copolymers, ethylene/ethyl acrylate copolymers, and the like; other thermoplastic nonreactive materials can also be utilized as dielectric materials for those conductors and can be recovered by the present process. Illustrative of other thermoplastic polymers are the linear polyhydroxy ethers, linear polyesters such as the polycarbonates and the like and thermoplastic copolymer compositions containing such copolymers.

Illustrative of the thermosetting resins which can be utilized as dielectric materials are the epoxide polymers, the crosslinked polyesters, phenolic resins, melamine resins, aniline resins, the urethane polymers and the like as well as the cross-linked or vucanized rubbers, crosslinked olefin polymers, such as crosslinked polyethylene, crosslinked polypropylene, crosslinked ethylene/vinyl acetate and the like.

While the recovered thermoplastic materials can be utilized in the construction of electrical conductors or any other suitable methods of manufacture, the recovered thermosetting insulators are more limited in their utility. These polymers can however be utilized as fillers and decorative imbedments and other such uses as are known to the art. The recovery of these insulating materials is therefore also quite important. This recovery becomes an important factor relative both to the economics and conservation of these materials.

Although this invention is not limited in its application to cable construction, since this type of material is perhaps the most common configuration to which this invention applies, and for convenience the description hereinafter shall be directed to cable construction as illustrative.

In the performance of the process of this invention the scrap cable construction is severed into suitable and convenient lengths. This can be readily accomplished by any of the cutting means available to the art. Mechanical choppers, slicers, pelletizers, hot wires, mills, and the like can conveniently be used provided they are capable of reducing the cable to a suitable size.

By the term "suitable size" is meant a size which is convenient to handle under the conditions of this process and which is sufficiently small to expedite the removal of conductor metal therefrom. It should be noted that while shorter lengths provide more ore efficient removal of metal, the cutting procedure is correspondingly reduced in efficiency because of the large number of cuts which must be made in the cable. Furthermore it should be noted that the cable diameter is to a large extent determinative of the length to which the cable is severed. For example, larger diameter cable can be cut in longer lengths than can fine diameter cable and still efficiently effect metal removal. Convenient size cuttings are indicated below.

| Cable diameter, inches: | Length cut, inches |
|---|---|
| 0.038 | 0.25 |
| 0.25 | 1 |
| 1.0 | 16 |
| 4.0 | 16 or greater |

Long segments of larger diameter cable can be held suspended vertically in a molten pool of the metal conductor, conveniently held in bundles and suspended vertically inside an induction heating coil or can be merely added to a pool of the molten metal. A convenient and effective length of the cuttings is from ¼ to 120 inches depending on the cable diameter, as indicated above.

It will be appreciated that the cutting step as well as all other steps involving the alkali metal conductor should be conducted in an inert media, preferably an inert atmosphere or oil.

The alkali metal conductor is recovered from the cable segments by heating the metal to a temperature above its melting point and recovering the metal directly in its molten form. This can be readily and effectively accomplished by immersing the cable segments directly in a bath of the same alkali metal as the conductor element. The alkali metal conductor thereby melts and becomes part of the bath. Excess metal can be continuously or periodically removed from the bath preferably below the level of the metal. When this method is used, minor impurities such as oxides and hydroxides generally form as slag which can be effectively removed by drainage at the level of the liquid periodically. This can generally be accomplished without disrupting normal operation of the recovery procedure. The recovered metal can be further purified after separation by filtration or distillation if desired.

The insulation material is desirably held captive in a screen or well to facilitate recovery of this material. This can be effectively accomplished by retaining the cable segments in a submersible container provided with access ports through which the molten metal can pass but which are sufficiently small to retain the segments. Grating, wire screening, or mesh baskets are excellent for this purpose.

The cable segments are then charged to the submerged captive well, or mesh basket where they are heated to a temperature sufficiently high to melt the alkali metal but below the melting point or decomposition point of the insulating material. After a period of time sufficient to effectively melt the conductor metal charged to the bath the captive well is removed from the bath thereby removing the insulation. Removal of the alkali metal from the insulation to the bath can be facilitated by moving, agitating and rotating the submerged captive well or mesh basket through the alkali metal bath.

In another embodiment of this invention the separation of sodium metal is effected in a bath of an inert oil preferably having a density less than that of the metal conductor and preferably though not necessarily greater than that of the insulation. The inert oil which is suitably heated to a temperature below its decomposition temperature and below the melting point of the insulation serves as a heating medium and also shields the metal from oxygen. If the oil is of the proper density the metal will sink to the bottom of this bath and preferably the insulation will float to the surface. The oil medium in this instance must be naturally selected with the density at the operating temperature in mind. If it is desired to use the oil medium to effect separation, careful temperature control must be employed to prevent melting the insulation.

The use of a movable and preferably rotatable perforated captive well or mesh basket in combination with a hot oil bath finds particular utility in another embodiment. The insulated alkali metal conductor segments can, for instance, be inserted in the mesh basket and rotated horizontally or vertically through an oil bath heated to a temperature sufficient to melt the alkali metal conductor but below the melting point of insulation to aid the removal of the alkali metal from the insulation. Oil density is of less importance in this embodiment since the insulation is separated from the oil and molten alkali metal by removing the captive well from the oil bath. In this embodiment the oil can be used to retain and protect the alkali metal from oxidation.

When an inert oil is to be used as the heating medium, any hydrocarbon, hydrocarbon ether, or silicon type oil can be used provided it is substantially inert in relation to the alkali metal conductor and provided, where necessary, that it is of suitable density as indicated above.

It will be appreciated that other means of removing the insulation from the molten alkali metal can be used such as by decantation and direct recovery. The embodiments indicated above however have been found to be advantageous in simplicity and effectiveness of operation and are well suited to recover large volumes of material for these reasons the indicated embodiments are preferred.

It will be further appreciated that various expedients can be employed to facilitate removal of the alkali metal. One such expedient is by agitation of the cable segments in the melting chamber. This can be effected by any of the agitating means available to the art such as stirring, vibrating, and the like.

Another expedient which can be employed to remove the sodium conductor from the insulation sheath is pressing. This is advantageously applied after the conductor metal has been melted. Pressing greatly improves the efficiency of the recovery in its application to small diameter conductors.

Other expedients which can be used to expedite recovery include crushing, and/or slitting of the insulator material prior to heating.

As was indicated above all recovery steps involving the alkali metal should be conducted in an inert media preferably an inert atmosphere for purposes of safety and reduction in the slag formation. Any of the dry inert gases can be used for this purpose. Illustrative of these inert gases are nitrogen, argon, neon, helium, krypton, xenon, and the like. Because of its availability and relatively low cost, nitrogen is the preferred inert gas in which to conduct low temperature recovery of the metals. However, if excessively high temperatures are contemplated, the noble gases are more desirable as the alkali metals can form nitrides at high temperatures. As indicated above, inert oil can be used as an effective shield for the metal. When such oil is used, it is not always necessary to use a gas shield.

While the recovery process can be conducted at subatmospheric pressure, atmospheric pressure and superatmospheric pressure, it is desirable to treat the conductor to be recovered under at least a positive pressure. This excess, even slight, prevents entry of gaseous contaminants to the environment.

Additionally while it is desirable to utilize inert gases in substantially pure form, minor amounts of oxygen and water vapor can be tolerated as in the closed system these constituents are quickly removed by the hot alkali metal which serves as a "getter." The greater the amount of gaseous impurity however, the greater will be the slag formation.

After the alkali metal has been recovered, it should be stored under dry, inert conditions. If care has been exercised to control the slag removal, the metal recovered is substantially pure and can be immediately employed in the manufacture of electrical conductor or other utility.

The insulating material however, usually retains a thin layer of conductor at the interface of the metal and the insulation. For this reason the insulating material should be cleaned of this metal.

This cleaning can be accomplished by allowing the metal to hydrolyze or oxidize and removing the salt in water by washing. The hydroxides can be recovered from these washings or the washings can be used as caustic solutions in other processes. Alternatively they can be treated as waste and disposed of.

The washed insulation segments can then be melted, extruded, pelletized, and stored or used again in the manufacture of electrical conductor constructions or other purposes.

As another embodiment of this invention, the recovered insulation segments can be reduced to a powder by conventional techniques such as grinding. The powder can then be treated with water and thereafter be recovered directly.

The bath or recovery chamber can be heated by any suitable means known to the art such as flame, steam, heated oil, electricity and the like. If electrical heating is to be employed, it should be noted that induction heating can be used.

The examples which follow serve to illustrate this invention.

Example I

A six inch length of sodium metal electrical conductor insulated with high density polyethylene had the following specifications.

| | |
|---|---|
| Conductor diameter | 0.250 inch. |
| Insulation outside diameter | 0.342 inch. |
| Conductor weight | 4.66 grams. |
| Electrical equivalent | No. 6 copper wire. |

This wire was cut into one inch lengths in an inert atmosphere of argon containing from about 1% to 2% oxygen. The sample was heated in a tared beaker until the sodium conductor melted and flowed from the segment. Final sodium temperature was about 190° C. The polyethylene insulation was carefully removed by forceps. The sodium metal remaining in the beaker was 4.17 grams or approximately 90 percent of the sodium in the original sample. The recovered insulating material can subsequently be washed with water, melted, and extruded.

Example II

A three foot length of low density polyethylene insulated wire having the following dimensions was reclaimed:

| | | |
|---|---|---|
| Conductor diameter | inch | 0.038 |
| Insulation outside diameter | do | 0.062 |
| Conductor weight | gram | 0.65 |

This sample was cut into one-quarter inch lengths and placed into a small basket made of 16 mesh wire screen. The basket was then immersed in molten sodium previously recovered. Upon heating, the individual lengths of wire became shorter and increased in cross-section, resulting in easier removal of the sodium. Sodium recovered was 0.23 gram approximately 35 percent of the original. Sodium metal adhering to the screen was not calculated as recovery.

Example III

Forty feet of one inch polyethylene jacketed 0.5 inch conductor was cut to six inch lengths. These segments were placed vertically in a mesh basket made from one-half inch hardware cloth and designed to fit freely in a five gallon metallic container. This basket was sufficiently weighted to insure complete immersion. Wires were secured to the basket and drawn through holes in the cover of a five gallon metallic container.

Approximately three inches of metallic sodium was placed in the bottom of a five gallon metallic container. The mesh basket containing the cable segments was placed in the container so that it rested freely on the surface of the metallic sodium. The container was covered and then heated to a temperature of about 120° C. and this temperature was maintained until the sodium conductor in the cable segments became moltent.

2.50 pounds of sodium conductor was recovered amounting to a 77 percent by weight yield.

13.1 pounds of polyethylene insulation was recovered. This material was contaminated with residual sodium metal and can be cleaned by dipping in water.

In a similar manner sodium conductor can be recovered utilizing an oil bath. In this instance the initial charge of sodium metal is replaced with a suitable inert dry oil having a density less than that of sodium. In this case it is desirable to recover the metal by tapping the container below the oil level. The recovered metal, purified by filtration is suitable for re-use.

Example IV

A basket 20 inches in diameter and 8 inches wide was fabricated from 0.5 inch wire mesh, equipped with a baffle extending its width and mounted on a horizontal axis. Segments of 0.866 inch diameter polyethylene insulated alkali metal conductor cable cut to lengths of from about 4 to 6 inches were loaded into the basket such that the basket was less than half full. In all 2368 grams of the segmented cable were loaded into the basket. The mineral oil bath was heated to 115° C. and the basket inserted to less than half of its diameter but sufficient to submerge all conductor segments. The temperature of the bath immediately dropped to 106° C. then to 104° C. where it was maintained by suitable controls for the remainder of the operation. The basket was rotated at 2.75 r.p.m. with the baffle serving to tumble the segments. After 28 minutes the basket was stopped, removed and the polyethylene insulation was found free of sodium.

Example V

A perforated basket 11 inches in diameter on the vertical axis of a centrifuge was partially filled with 1995 grams of one inch diameter polyethylene insulated sodium conductor cable cut to lengths of from 2–4 inches. Hot oil was circulated through the basket until the mass was brought to 100° C. Circulation was then continued for twenty minutes until a temperature of 104° C. was reached. The basket was then spun at 700 r.p.m. for one minute to utilize centrifugal force to separate the molten sodium from the polyethylene insulation. As the basket was spun, oil and molten sodium were drained from the centrifuge. After the sodium settled the oil was decanted and sodium of excellent purity was recovered.

What is claimed is:

1. The method of recovering the alkali conductor metal from insulated alkali metal electrical conductors which comprises the steps of heating conductor segments of a suitable size to a temperature above the melting point of the alkali metal but below the melting point of the insulating material in a molten bath of alkali metal, removing said insulating material and thereafter recovering said molten alkali metal, said steps being conducted in a substantially inert media.

2. A method as claimed in claim 1 in which the inert media is an inert atmosphere.

3. The method of recovering the components of an insulated alkali metal electrical conductor which is insulated with a thermoplastic insulating material which comprises the steps of heating segments of the insulated alkali metal electrical conductor in a bath of an inert oil to a temperature in excess of the melting point of the metal conductor but below the decomposition point of the oil and the melting point of the insulation and recovering said molten alkali metal, said inert oil having a density which is less than the density of said alkali metal so that said metal tends to sink to the bottom of said inert oil bath for recovery.

4. The method of claim 3 wherein the thermoplastic insulation is recovered, cleaned, melted, extruded, and pelletized.

5. The method of claim 3 wherein the alkali metal conductor is selected from the group consisting of sodium and alloys thereof.

6. The method of claim 3 wherein the thermoplastic insulating material is a thermoplastic olefin polymer.

7. The method of claim 1 wherein said segments are placed in a container and said container dipped into the molten metal.

8. A method as claimed in claim 7 in which the container is apertured.

9. A method as claimed in claim 3 in which said segments are placed in a container which is dipped into the inert oil bath.

10. A method as claimed in claim 9 in which the container is apertured.

11. The method of recovering the components of an insulated alkali metal electrical conductor which comprises the steps of placing segments of the insulated alkali metal electrical conductor in a rotatable container, rotating said container through a bath of inert oil maintained at a temperature above the melting point of the metal conductor but below the melting point of the insulation for a period of time sufficient to cause the alkali metal to separate from the insulation for recovery.

12. A method as claimed in claim 11 in which the container is rotated about a horizontal axis.

13. A method as claimed in claim 11 in which the container is rotated about a vertical axis at a sufficient velocity to cause centrifugal separation of the alkali metal from the insulation.

14. A method as claimed in claim 11 in which the container is apertured.

15. A method as claimed in claim 12 in which the container is apertured.

16. A method as claimed in claim 13 in which the container is apertured.

17. A method as claimed in claim 11 in which the alkali metal is selected from the group consisting of sodium and alloys thereof.

18. A method as claimed in claim 17 in which the insulation is a thermoplastic olefin polymer.

References Cited

UNITED STATES PATENTS

| | | | |
|---|---|---|---|
| 1,669,485 | 5/1928 | Nordling et al. | 75—63 |
| 1,722,372 | 7/1929 | Hallam | 75—63 |
| 2,029,998 | 2/1936 | Gilbert | 75—66 |
| 2,759,896 | 8/1956 | Hawkes et al. | 75—66 X |
| 3,044,869 | 7/1962 | Silverman et al. | 75—93 X |

HYLAND BIGOT, *Primary Examiner.*

H. W. TARRING, *Assistant Examiner.*

U.S. Cl. X.R.

264—37; 75—65; 174—111